INVENTORS
LEONARD JOHN MINNICK
CYRIL PRESGRAVE
BY Howson & Howson
ATTYS.

United States Patent Office

2,937,219
Patented May 17, 1960

2,937,219

ELECTRIC CURRENT PRODUCING CELL AND METHOD OF GENERATING CURRENT WITH SAME

Leonard John Minnick, Cheltenham, and Cyril Presgrave, Gwynedd Valley, Pa., assignors to G. and W. H. Corson, Inc., Plymouth Meeting, Pa., a corporation of Delaware Application November 14, 1955, Serial No. 546,364

30 Claims. (Cl. 136—6)

The present invention relates to a novel electric current-producing cell, and to a novel method of generating electric current using the same; and, more particularly, the invention relates to a novel electric current-producing cell system embodying an electrolyte in which the principal solvent is liquid ammonia instead of water as is the case in conventional electric current-producing cells. The invention also relates to a battery comprising two or more of such simple cells.

The electric current-producing cells and batteries in general use for years down to the present day utilize an aqueous solution of some acid, base or salt as an electrolyte. These cells and batteries perform under standard conditions of atmospheric pressure and temperature, and most of them can be stored for reasonable periods of time without deterioration. The effect of increasing the temperature in storage tends, in general, to reduce the shelf life of these cells and batteries. Reduction in temperature below freezing causes them to become inoperative. The chief reason for this inoperative characteristic of conventional cells and batteries at low temperatures is the electrolyte employed. While the introduction of certain solutes can be used to lower the freezing point of the aqueous electrolyte, it is still impossible to obtain good cell characteristics in these cells at temperatures very much below the freezing point of water. In the case where temperature greatly below the freezing point of water are encountered, the conventional aqueous type cell will not operate. The conventional aqueous cell systems, therefore, possess limitations which render them unsatisfactory for operation at low temperatures as encountered for example, in arctic regions or at high altitudes.

Because of the limitations of aqueous cell systems there have been attempts to prepare cell systems in which the principal solvent for the electrolyte has been one or another organic liquid, such as pyridine, methane amide, methyl acetate, methanol, and the like. However, any advantage gained through the use of such liquids has been small relative to the limitations and the disadvantages encountered, and these systems have never achieved any commercial success.

In our copending application Serial No. 317,136, filed October 27, 1952, now Patent Number 2,863,933, is disclosed and claimed a cell system in which the electrolyte solvent is anhydrous liquid ammonia. In this cell system the anode comprises an electropositive metal, the analyte comprises a salt dissolved in the liquid ammonia, the cation of which corresponds to the electropositive metal of the anode and the catholyte comprises an ammonium and/or metal salt dissolved in the liquid ammonia the metal cation of which develops an electrolytic potential in liquid ammonia at least 0.75 volt less than that developed by the metal of the anode in liquid ammonia.

It is the principal object of the present invention to provide a novel electric current-producing cell which readily operates at temperatures well below the freezing point of water.

A further object of the invention is to provide a novel electric current-producing cell system which is not only capable of operation at temperatures well below the freezing temperature of water, but is also capable of operation at normal or extremely high atmospheric temperatures.

Still another object of the invention is to provide a novel electric current-producing cell which possesses, not only the characteristics discussed above, but also which possesses the most advantageous characteristics of conventional aqueous type cells; and in fact, provides markedly improved operating characteristics over conventional cells.

Still another object of the present invention is to provide a novel electric current-producing cell containing liquid ammonia as the principal electrolyte solvent which possesses advantages over the cell of the above-mentioned copending application including faster activation, greater power, higher current capacity and lower internal resistance.

Still another object of the invention is to provide a novel method of generating electric current by chemical means at temperatures well below the freezing point of water as well as at ordinary or extremely high atmospheric temperatures.

A specific object of the invention is to provide a novel electric current-producing cell in which the principal electrolyte solvent is liquid ammonia and which is capable of use and operation at even high atmospheric temperatures without application of pressure on the electrolyte.

Other objects will become apparent from a consideration of the following specification and claims.

Before discussing the present cell in detail, it will be helpful to consider the nature of liquid ammonia and of the liquid ammonia system. Under ordinary atmospheric conditions ammonia is a colorless gas. Upon cooling, however, under one atmosphere pressure, this gas can be converted to a liquid at about −33° C. Liquid ammonia freezes at about −77° C. Theoretically, liquid ammonia ionizes mainly into the ammonium ($NH_4^+$) ion and amide ($NH_2^-$), imide ($NH^=$) and nitride ($N^{\equiv}$) ions, the ammonium ions corresponding to the hydrogen ions of the aqueous system and the amide, imide and nitride ions corresponding to the hydroxyl ions of the aqueous system. However, as a practical matter, liquid ammonia does not ionize measurably. Under present day chemical terminology, the names of classes of inorganic compounds are based on the aqueous system. In other words, ammonium hydroxide is normally considered to be a base while ammonium compounds produced, for example, by the neutralization of ammonium compounds produced, for example, by the neutralization of ammonium hydroxide with an acid, are normally considered to be salts. It will be seen that in the liquid ammonia system, conventional terminology may be misleading in that, in the liquid ammonia system, ammonium compounds provide ammonium ions and hence ammonium hydroxide is actually a weak acid with respect to liquid ammonia, and ammonium salts, such as ammonium thiocyanate, are actually strong acids. Water, since it forms ammonium ions in the liquid ammonia system, functions as a weak acid. The addition of water to liquid ammonia is similar to adding ammonium hydroxide. By the same token the addition of an acid (HA) results in the formation of ammonium ions and hence produces acidity ($NH_4A$) in the liquid ammonia system. The bases in the liquid ammonia system, the amides, imides and nitrides, are in general insufficiently soluble for practical electrolyte compositions. There are many analogies between the function of ordinary metal salts in liquid ammonia and their function in water. It will be seen, however, that in electrolytes wherein liquid ammonia is the principal solvent, "acidity" or "neutrality" may be controlled by the addition of ammonium compounds, water or acid, on the one hand, or of amides, etc., on the other. Herein, reference is made to ammonium compounds, that is hydroxide or salts, in accordance with conventional terminology in spite of the fact that, in the liquid ammonia system, they are the acids.

Liquid ammonia by itself is not sufficiently conductive to serve as an electrolyte in an electric current-producing cell. As in the case of water in the aqueous cell systems, material freely ionizable in the solvent, ammonia, must be added to the liquid ammonia in order to render it sufficiently conductive. In said copending application Serial No. 317,136, as stated, a salt of an electropositive metal is dissolved in the liquid anhydrous ammonia to serve as an anolyte and an ammonium and/or metal salt is dissolved in the liquid anhydrous ammonia as catholyte.

The electrolyte system of the present will comprise liquid ammonia as the principal solvent and material ionizable in ammonia and dissolved in the liquid ammonia to impart conductivity thereto. However, in the present cell system, the anolyte portion of the electrolyte will contain ammonium ions, that is it will be "acid." The catholyte portion may or may not contain ammonium ions. The solute, as is also the case in aqueous cell systems, will impart electromotive reactivity to the electrolyte so that the current-producing reactions will take place. It will be seen from the foregoing, that the ammonium ion-providing and conductivity-imparting solute in the anolyte may be an ammonium salt, or ammonium hydroxide, the ammonium hydroxide being added as such or by formation in situ by the addition of water to the ammonia, or may be a mixture of any two or more of these. As will be pointed out more in detail hereinafter, water, in addition to serving as an ammonium ion-providing and conductivity-imparting solute, imparts other characteristics to the electrolyte which may be advantageous under certain conditions, such as increasing the boiling point of the electrolyte or decreasing the freezing point thereof. The conductivity imparting solute in the catholyte of the present cell system may be any salt, or ammonium hydroxide or a combination of any two or more of these.

In its broadest aspect the electric-current-producing cell of the present invention will comprise an anode and a cathode; and an electrolyte comprising, as the principal solvent, liquid ammonia, and ionizable material in solution in the liquid ammonia to render it conductive, the ionizable material in the anolyte portion of the electrolyte comprising ammonium ions.

To aid in the understanding of the present invention, consideration may be had of the attached drawings in which.

The generation of electric current in accordance with the present invention, comprises bringing an anode and a cathode in contact with the stated electrolyte and completing the circuit, with an external load, between the anode and cathode. The mechanism by which electric current is produced will be discussed more in detail hereinafter.

By the present invention electric current-producing cells which possess outstanding current-producing characteristics over a wide range of temperatures from the highest atmospheric temperatures encountered or even higher to even below the freezing point of liquid ammonia, can be produced employing an electrolyte comprising, as the principal solvent, liquid ammonia and appropriate solute material. By various combinations of anode material, cathode material and electrolyte comprising the liquid ammonia, cells of widely varying performance characteristics can be produced designed specifically, for example, for "one-shot" (reserve) application; for long-life primary applications; rechargeable secondary applications; for "dry cell" type of units, or the like. Practical cells can be produced in accordance with the present invention which are capable of developing as high as 3.5 volts or more at significant current levels. It is not possible as a practical matter to prepare an aqueous cell system for the storage and production of power where such potentials can be realized. The foregoing is particularly surprising when it is realized that ammonia is a gas over the major portion of the range of atmospheric temperatures encountered. Compared with the cell of said copending application, the present cells are capable of faster activation and possess greater power, lower internal resistance and higher current capacity.

Referring again specifically to the electrolyte, the rendering of the liquid ammonia sufficiently conductive will present no problem to those familiar with the current-producing cell art. In general, the more acid the liquid ammonia electrolyte, the higher the conductivity, as is the case in conventional aqueous systems. As stated, the acids in the liquid ammonia system are the ammonium compounds, that is, ammonium hydroxide (added as such or formed in situ by the addition of water) and ammonium salts (added as such or formed in situ by the addition of an acid); and hence, in accordance with the broader aspects of the present invention, any ammonium compound soluble in liquid ammonia at least to the extent hereinafter discussed, may be employed as part or all of the solute at least adjacent the anode to impart the requisite conductivity. Of the ammonium compounds, ammonium thiocyanate and ammonium perchlorate are particularly advantageous. These salts are freely soluble in liquid ammonia. As stated, water forms ammonium ions and thus functions as a weak acid in liquid ammonia. Hence, water may be employed as par or all of the solute to impart the requisite conductivity.

The acidity that can be tolerated in any particular cell system, however, may be limited by the nature of the other components of the cell, particularly the anode. As will be pointed out more in detail hereinafter, in some situations care must be exercised in controlling the acidity of the electrolyte to avoid undue local action at the anode. Hence, the requisite conductivity of the electrolyte may be provided in whole or in part in the catholyte and in part in the anolyte by the addition of metal salts which, in the ammonia system, are more or less neutral. Any metal salt which is soluble in liquid ammonia to the extent hereinafter discussed more in detail, may be employed for this purpose. As in the case with the ammonium compounds, the metal thiocyanates and perchlorates are particularly advantageous.

Referring to the amount of ammonium ions in the anolyte, the ammonium ion concentration at the anode should be such as to produce an ammonium electrode potential not substantially less than the anode potential. The exact difference between the ammonium electrode potential and the anode potential will depend primarily on the characteristics desired in the cell as determined by its proposed application. For example, if it is desired that the cell possess a long shelf life, the difference between the two potentials would in general be less than in the case of a cell which is designed primarily for reserve operation. The greater the ammonium electrode potential is below the anode potential, the more rapid the deterioration, by chemical action, of the anode. In some situations, inhibitors can be added to the electrolyte to hold down chemical deterioration of the anode. The consideration of ammonium electrode potential at the anode also applies to metal ions in contact with the anode which may be present in the electrolyte as initially prepared or resulting from the cathode in storage or operation. The ammonium electrode potential in any particular embodiment of the ammonia system is also increased upon increase in pressure since, under pressure, the hydrogen evolved at the anode has greater difficulty being evolved. Pressure and its effect on ammonium electrode potential may also be taken into consideration in determining the ammonium ion concentration.

Since, in general, the anode may favor one set of conditions, e.g., low acidity, and the cathode may favor another set of conditions, e.g. high acidity, the electrolyte overall may often be a compromise between these two extreme considerations; on the other hand, the electrolyte may actually be divided into two separate components, namely an anolyte and a catholyte, the two parts being separated by a porous or permeable diaphragm.

Figure 4:
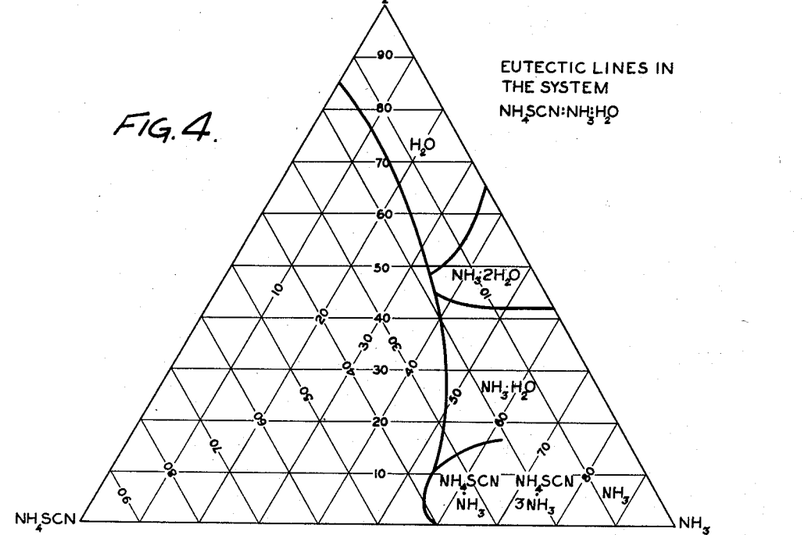
Figure 4 is a triaxial diagram showing eutectic lines for a specific system.

There are other factors which also determine the amount of solute incorporated in the liquid ammonia. One of the primary considerations in this connection is the temperature under which the cell is designed to operate. In general, the conductivity of the electrolyte decreases with decreasing temperature. For any given solute at any particular temperature, there is an optimum concentration of solute to provide the optimum conductivity. Below and above this optimum concentration, the conductivity falls off. In other words, by plotting conductivity versus concentration of solute at any given temperature, there results a curve which starts out at the low side of conductivity, ascends to one or more peaks and then drops off again. Thus, if the cell is to operate at any exceedingly low temperature, and it is desired to provide maximum conductivity at that temperature, the concentration of solute must be controlled. Where the cell is to operate at higher temperatures, such as high atmospheric temperatures or above, it is often desirable to incorporate sufficient solute, especially water, to raise the boiling point of the electrolyte to at or above the temperature conditions to which the cell is to be subjected to avoid the use of pressure. Again, when the cell is to operate at exceedingly low temperatures, it will be necessary that the electrolyte remain as a liquid at that operating temperature. By referring to Figure 4, it will be seen that, with certain molar proportions of the specific solute there-discussed, ammoniated ammonium thiocyanate or hydrated ammonia freeze out. Thus, when operating at these temperatures, the amount of solute employed should be substantially less than that providing, with the ammonia, the ammoniated or hydrated ammonia compound which freezes at those temperatures. For example, $$NH_4SCN \cdot NH_3$$

freezes out, in the absence of water, at about −20 to −40° C., so that a cell designed to operate at this temperature should not have, as electrolyte, a mixture of ammonium thiocyanate and ammonia in a 1:1 molar ratio.

Another factor to be taken into consideration in determining the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell; and, in many cases, the anode potential is reduced. Similar considerations apply to the cathode; however, the nature of the cathode material and/or type of solute will frequently result in different ranges of concentration requirements.

The above-mentioned considerations being borne in mind, the amount of solute salt actually dissolved in the liquid ammonia may range up to the limits of its solubility in liquid ammonia at the temperature under consideration. The amount of solute salt actually present may exceed the limits of its solubility. Thus, aside from the questions of optimum conductivity and of the freezing out of solvated compounds as discussed above, it is not material that excess undissolved solute salt is present in the electrolyte. In fact, it may be desirable in certain instances to employ excess solute salt so that, should the cell be subjected to elevated temperatures, the excess salt will go into solution raising the boiling point of the electrolyte.

Mention has been made hereinabove of the use of water as a solute to supply ammonium ions and to impart sufficient conductivity to the liquid ammonia. Although water may be added to the liquid ammonia, the amount added will not be such as to convert the system to an aqueous system; the water addition, in accordance with the present invention, merely being as solute and the liquid ammonia still being the solvent. The water, as stated, acts as a weak acid in liquid ammonia by combination therewith; and this provides a reserve of ammonium ions. That is to say, the water combined with the ammonia to provide ammonium hydroxide which, as stated, acts as a weak acid in liquid ammonia. Water also raises the boiling point of the electrolyte, the extent to which the boiling point is raised being proportional generally to the proportion of water added. The addition of water is, therefore, advantageous in systems where it is desired to operate at temperatures markedly above the boiling point of liquid ammonia without the use of applied pressure. The addition of water increases the chemical reactivity of the electrolyte, and the chemical reactivity of certain of the anode materials discussed more in detail hereinafter toward the water-containing liquid ammonia must be taken into consideration in determining how much water to add in any particular instance. In connection with the foregoing, at about 10 mol percent of water a significant decrease in vapor pressure and freezing point begins and at about 20 mol percent of water a substantial decrease in vapor pressure and freezing point and a substantial increase in conductivity begins. Because of the fact that water combines with ammonia to provide ammonia hydrates, liquid ammonia can tolerate a substantial quantity of water before the system is converted to an aqueous system. Freezing point determinations have shown that, in water-ammonia combinations, the ammonia system approaches the water system at concentrations of water above about 70 mol percent. At and below about 70 mol percent of water, the system has other than aqueous properties and is, therefore, an ammonia system.

In order to provide significant current capacity in the cell, it has been found necessary to employ at least about 1 mol percent of solute, that may be either water or salt or a combination of both, and that, at least in the anolyte, there be at least 0.1 mol percent of ammonium ions. When the solute is water and/or an ammonium salt it will also be the source of the ammonium ions. While water may make up the entire solute, it is preferred that at least 1 mol percent of a salt be present. Particularly advantageous results are obtained when there are at least about 2 mol percent of solute salt present in the ammonia. As to upper concentration limits for the solute, it is obviously impossible to set a specific figure and say that the compositions on one side are all operable for any purpose and those on the other side are not, since much depends upon the particular solute or solutes selected, the nature of the anode and of the cathode, the operating characteristics desired, the temperature and pressure conditions under which the cell is to be operated, and the like, all of which factors must likewise be taken into consideration in conventional aqueous current-producing cell systems. However, an area may be defined within which the composition of the electrolytes of the various cell systems devisable in accordance with the present invention will lie.

Figure 1:
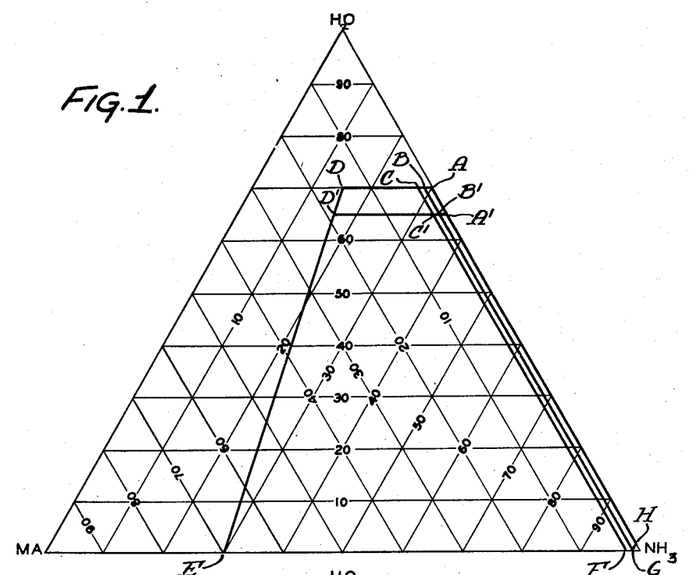
Figure 1 is a triaxial diagram showing generally the limits for the ranges of proportions of the principal constituents of the electrolyte employed in accordance with the present invention; bearing in mind that the anolyte portion of the electrolyte will contain ammonium ions as stated above.

In connection with the foregoing, consideration may be had of Figure 1 which represents a triaxial diagram setting forth the area referred to above. The composition of the electrolyte employed in accordance with the present invention may be defined broadly as being within the area AHGED and comprising, at least in the anolyte, at least 0.1 mol percent of ammonium ions. Above line DA there would be excessive water present, and the system would be primarily an aqueous system lacking the novel characteristics of the present system. Advantageously, the water content is below line D'A'. Line AH represents the embodiment in which the sole solute used in water. To the right of the line HG, the conductivity of the electrolyte and the current capacity of the cell fall off sharply and are insignificant. Line GE represents the embodiment wherein the entire solute is made up of salt (MA), at least some of which is an ammonium salt to provide the requisite ammonium ion concentration in the anolyte, and in which the system is anhydrous. To the left of line ED there is insufficient solvent for the electrolyte to be of any practical value. Line BG represents the minimum salt concentration of about 1 mol percent in the electrolyte in accordance with a more preferred embodiment of the invention; in which case the area of compositions is within BGED, while line CF represents the minimum of about 2 mol percent concentration of salt in accordance with still more preferred embodiment of the invention in which case the area is CFED. When line D'B' is selected as the maximum water content, these latter two areas are reduced to B'GED' and C'FED', respectively.

Referring specifically to the solute salt, represented by MA in Figure 1, it may be any salt or mixture of salts sufficiently soluble in liquid ammonia to provide the requisite solubility. The thiocyanates and perchlorates have already been mentioned as being particularly advantageous salts for this purpose. Other salts that may be mentioned as being applicable are the cyanides, nitrates, chlorides, cyanates, fluoborates, iodides, nitrites, and the like. Combinations of such salts may be employed. As far as the cation of the salt is concerned, it may be selected from a wide range of metals as well as ammonium. When the cation is a metal, it will generally be a metal above iron in the electrochemical series, particularly lithium, sodium, potassium, caesium, rubidium, calcium, strontium, barium, magnesium, zinc, aluminum, beryllium, manganese, and the like or mixtures thereof. Salts of the alkali and alkaline earth metals, especially salts of lithium, calcium, and magnesium, and zinc salts, are particularly preferred. Of all the salts, the ammonium salts and the lithium salts have been found to be particularly advantageous; and, in many instances, the electrolyte will contain a combination of ammonium and lithium salts. The salts referred to above and represented by MA in Figure 1 also include hydrates of the salts such as those in which one or two mols of water are associated with the metal cation. Examples of such salts are lithium thiocyanate monohydrate $$(M=Li^+ \cdot H_2O)$$

lithium thiocyanate dihydrate ($M=Li^+ \cdot 2H_2O$) and calcium thiocyanate dihydrate ($M=Ca^{++} \cdot 2H_2O$). As pointed out previously, ammonium salts in solution in liquid ammonium can be provided by adding an acid (HA) which reacts with the ammonia forming an ammonium salt ($NH_4A$) in situ. In addition, other materials may react with ammonia to provide an ammonium salt. Hence, the ammonium salts referred to above may be provided in situ by reaction between another material and the ammonia, and where reference is made herein to the use of ammonium compounds or salts as solute it will be understood to include the formation of the compound or salt in situ.

Figure 2:
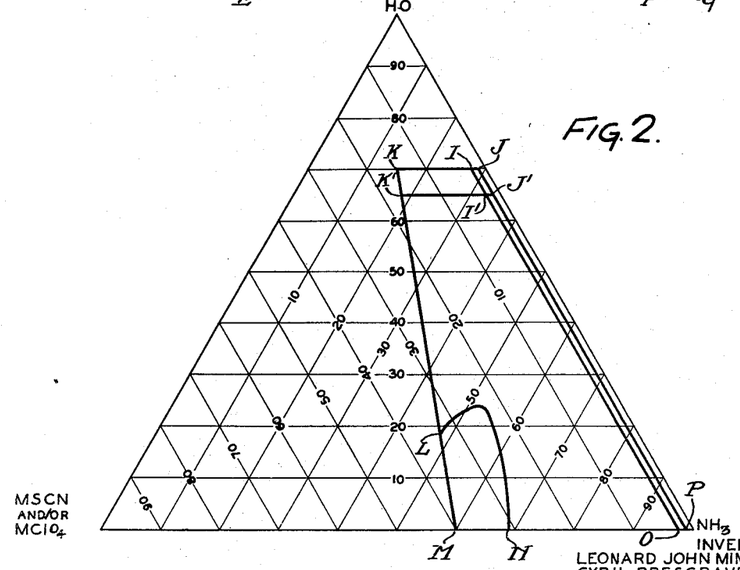
Figure 2 represents a triaxial diagram defining the limits of the preferred ranges of proportions for the principal constituents of a preferred system of electrolytes.

As stated above, the preferred solute salts are the ammonium and lithium thiocyanates and perchlorates. Figure 2 is a triaxial diagram setting forth the limits of the ranges of preferred compositions in which these salts are employed, the area being broadly defined as being within JPMK, it being understood that there will be present at least 0.1 mol percent of ammonium ions, at least in the anolyte. In the figure, line KJ represents the maximum proportion of water present, and, as in the case of Figure 1, the water content is preferably below line K'J'. Line JP represents the minimum concentration of salt in the electrolyte, namely about 1 mol percent. Line PM is an anhydrous embodiment wherein the electrolyte is made up of liquid ammonia and salt, compositions falling above line PM containing progresisvely increasing amounts of water. Line MK represents the maximum concentration of salt. In general the compositions falling within the area to the right of line MK have freezing points below about −40° C. and are particularly applicable for operation at exceedingly low temperatures. Compositions within the area LNM have been found, from freezing point and conductivity measurements, to possess somewhat different properties in that the salts freeze out at temperatures above −40° C. and the conductivity of these compositions are lower than the remaining compositions within the larger area. For these reasons, the more preferred compositions in accordance with Figure 2 are those falling within the area JPNLK, especially J'PNLK'. Line IO represents, as in Figure 1, a more preferred minimum salt concentration of about 2 mol percent thus providing the still more preferred areas IOMK, IONLK, I'OMK' and I'ONLK'. The cation "M" as used in connection with the expressions MSCN and MClO$_4$ in Figure 2 represents $$NH_4^+, Li^+, Li^+ \cdot H_2O, \text{ or } Li^+ \cdot 2H_2O$$

The foregoing discussion has dealt with the electrolyte broadly and little distinction has been made between the situation where the electrolyte is uniform throughout and the situation where the electrolyte is divided into two components—the anolyte and the catholyte—in which the anolyte and the catholyte differ as to composition. In certain instances it is desirable that the anolyte, that is the portion of the eletcrolyte adjacent the anode, and the catholyte, that is the portion of the electrolyte adjacent the cathode, differ from each other as to composition. In such case, the anolyte and the catholyte of different compositions within the areas discussed above, may be separated from each other by means of a porous or permeable diaphragm. Even in this case the anode and the cathode will be in ionic flow relationship.

The provision of a separate anolyte and catholyte is especially applicable to a cell embodiment in which the electrolyte is free of water. In this case, in addition to an anode, which comprises an electropositive metal of the type discussed herein, there will be an anolyte comprising an ammonium salt and a salt dissolved in anhydrous liquid ammonia the cation of which is a metal corresponding to the electropositive metal of the anode (metal ions of higher potential may also be present for conductivity, etc., under certain operating conditions) and a cathode section comprising a salt dissolved in anhydrous liquid ammonia the cation of which is ammonium or a metal which develops an electrolytic potential in liquid ammonia at least 0.75 volt less than that developed by the metal of said anode in liquid ammonia (other nonreactive metal ions may be present for conductivity, etc.). Advantageously, the salt at the cathode section comprises a metal salt and the cathode also comprises a metal in elemental form, which corresponds to the cation of that salt.

The electrolyte may be in the form of a liquid or a paste as in the conventional so-called "dry" cells. Thus, the electrolyte as a whole, or the anolyte and/or catholyte, may be mixed with a suitable finely-divided material, such as glass fiber, mixtures of carbon and manganese dioxide, and the like, to provide a mass which will not readily spill.

Referring to the electrodes, the anode generally comprises an electropositive metal. In general, any metal above iron in the electrochemical series, particularly lithium, sodium, potassium, caesium, rubidium, calcium, strontium, barium, magnesium, zinc, aluminum, beryllium, manganese, and the like, or mixtures thereof as well as alloys containing one or more of these metals, is suitable. Of the metals, the alkali and alkaline earth metals and zinc, especially lithium, calcium, magnesium and zinc, particularly the first, are preferred.

The metal of the anode need not be in a rigid solid state. In Patent Number 2,615,838 is disclosed and claimed a method for producing alkali and alkaline earth metals by the electrolysis of a solution of a salt of the metal in a non-aqueous solvent, such as liquid ammonia. By this process, the alkali or alkaline earth metals can be plated out, and, depending upon the particular metal, may be obtained either in solid metallic form or as a paste or as an insoluble metal-ammonia complex referred to as a "bronze" liquid. The liquid "bronze" is believed to be a blend or solvated compound between the anhydrous ammonia and the metal, and an excess of ammonia may be present. The concentration of metal in ammonia is generally at least from about 7% to form the bronze. In higher concentrations some of the metal may be in suspension or in colloidal solution in the compound, and these liquids may contain up to 90% of the metal, the balance being ammonia. When the concentration is still higher, the stated paste is formed, and the concentration of the metal in the paste usually exceeds about 90% and may be as high as about 99%. The liquid "bronze" possesses a metallic luster and will usually be of a yellow or bronze color, although in some instances it may possess grayish characteristics. The term "bronze" is used herein to designate such coloration and to distinguish from a liquid possessing a blue coloration which results when a small amount of the metal is dissolved in liquid ammonia in a low concentration. The above-mentioned paste may be colored reddish brown, dark brown, or even black, and will possess the characteristic metallic luster. The paste can also be formed by adding more of the metal to the bronze liquid. The metal in solid form may be obtained from the "bronze" liquid or paste by evaporation of the solvent. The "bronze" or paste or metal resulting from the evaporation of the solvent from the bronze or paste, can be used as the anode in accordance with the present invention. The bronze or paste will readily float upon the anolyte employed in the present cell. Lithium is very stable even in the form of the liquid "bronze" or paste. Thus, a 10% solution of lithium bronze (the remainder being liquid ammonia) will keep in a closed container for several years with very slight evidence of spoilage, and if care be taken in sealing the material, no deterioration will be evidenced.

The exact nature of the material selected as anode will depend upon many factors including the characteristics desired in the cell. The characteristics desired may dictate the type of electrolyte required which, in turn, may determine what material should constitute the anode. For example, if it is desired that the cell operate at relatively high temperatures under atmospheric pressure, in which event it is desried that the boiling point of the electrolyte be relatively high, it may be necessary to include a substantial proportion of water in the electrolyte. In this event, and should it be desired that the cell have a substantial shelf life, the anode metal should not be one, such as the more active alkali metals, which reacts chemically with water. On the other hand, if high voltage is the criterion, a metal which is highly active, such as lithium, calcium, and the other alkali and alkaline earth metals and alloys containing them, may be selected for the anode. If a moderate voltage is desired, less active of the alkaline earth metals, such as magnesium, and other metals such as aluminum, manganese, zinc, and alloys containing them, may be selected. If shelf life is not of primary importance, such as in reserve energizers, the anode potential may exceed the reduction breakdown potential of the anolyte, and in this case highly active metals, such as lithium, may be employed in the anode in spite of the fact that the anolyte may contain a substantial proportion of water to raise the boiling point or lower the freezing point. As a general proposition, however, the reduction breakdown potential should never be substantially less than the anode potential in the anolyte employed.

Reference has been made above to the use, as anode, of alloys containing one or more of the metals listed. The alloying of the anode metal with another, less active metal, reduces the availability of the anode metal and, hence, its chemical activity. Thus, by appropriate selection of alloys containing highly active anode metals alloyed with less active metals, it is possible to employ as anode an alloy containing a highly active metal in situations where the use of that metal by itself would be impracticable. Examples of such alloys are lithium aluminum alloys, lithium amalgams, lithium zinc alloys, lithium magnesium alloys, and the like.

The cathode, in the strictest sense of the word, is the site of the cathodic reactions. Generally the tangible substance or substances and structure entering into the cathodic reactions are referred to as the cathode, and in this sense the cathode of the present cell will comprise an electric current conductor for conducting electrons into the cell and any material in contact with the conductor included to prevent accumulations at the cathode which would block operation. The cathode employed in the present cell must be a depolarizing cathode, that is to say, it will comprise a conductor of such a structure as to physically prevent accumulation of hydrogen or other polarizing products or a conductor and a material in contact therewith which chemically prevents accumulation of polarizing products. The injection of electropositive metal ions into the electrolyte from the anode during discharge must be coupled with a complementary withdrawal of positive ions or introduction of negative ions at the cathode otherwise the solvated proton will discharge from the electrolyte at the cathode causing the formation of hydrogen. Such formation of hydrogen not only absorbs much of the energy generated at the anode but the non-conducting bubbles or film thereof may cause partial loss of contact between the cathode conductor and the electrolyte. This effect as well as the formation of other reaction products which tend to raise the cathode potential and/or cause loss of contact between the cathode conductor and the electrolyte are termed herein "polarization." The prevention of this phenomenon, or "depolarization," can be achieved, as stated above, by physical means or by chemical means. Referring to the former, the ability of hydrogen to diffuse through solid materials, such as carbon and metals, is well known. If the cathode conductor, consisting of such material, has access to the exterior of the cell and is provided with sufficient surface area, the hydrogen formed at the cathode will diffuse into the cathode conductor and out of the cell substantially as fast as formed. The requisite surface area may be provided by employing a highly porous cathode conductor or by providing thin-protuberances, such as fins, thereon.

Preferably, depolarization is accomplished in accordance with the present invention by chemical means, that is by including a material, in contact with the cathode conductor, which reacts with polarizing products, thereby effectively preventing their accumulation. Since chemical depolarization takes place by reduction of the depolarizing material at the cathode, any reducible metal compound or non-metal in contact with the cathode conductor will be suitable for this purpose. The depolarizer may be in solution in the electrolyte contacting the cathode conductor or may be in solid form in contact with the cathode conductor. Preferably, in order to obtain significant power from the cell, the cathode will comprise, as depolarizer in contact with the cathode conductor, a compound of a metal that possesses a potential in liquid ammonia at least about 0.75 volt less than that provided by the anode metal in liquid ammonia. This metal compound may be soluble, partially soluble or insoluble in the catholyte. Metals, such as iron, nickel, copper, silver, lead, mercury, and the like, possess relatively low positive potentials or negative potentials. The metal compound employed at the cathode may, therefore, be of one of such metals so long as the algebraic difference between its electrolytic potential in liquid ammonia and the electrolytic potential of the anode metal in liquid ammonia is at least 0.75 volt. Examples of such metals in the form of compounds serving as depolarizers are manganese dioxide, lead oxide, lead dioxide, lead chloride, lead thiocyanate, silver oxide, silver peroxide, silver hydroxide, silver thiocyanate, silver chloride, mercury chloride, mercury thiocyanate, and the like. Salts of these metals soluble in the electrolyte at the cathode are desirable as depolarizers in one form of cell suitable for secondary use.

As stated, the depolarizing cathode will comprise, in contact with the cathode conductor, a compound of a metal which possesses an electrolytic potential in liquid ammonia of at least about 0.75 volt less than that possessed by the metal of the anode in liquid ammonia. Various investigators have studied and measured the electrolytic potentials of metals and metal compounds in liquid ammonia, and their findings are reported in the literature. Hence, utilizing the methods known to those familiar with current-producing cell systems and information available in the literature, within the principles stated herein, a cathode material may be selected in any particular situation.

The cathode conductor may be made up of a material that is inert to the electrolyte such as electrolytic carbon, platinum, boron, zirconium, tantalum, or the like. Of this group, carbon is the preferred material. However, in applications where carbon is mechanically unsuitable, a conducting depolarizer film may be used to coat and protect a reactive metal cathode conductor in the presence of a more active depolarizer.

Figure 3:
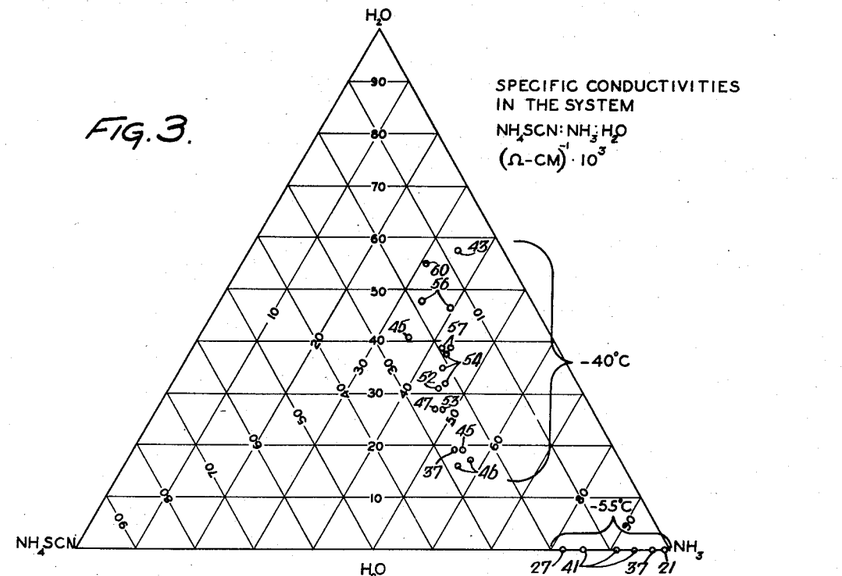
Figure 3 is a triaxial diagram showing specific conductivity figures for various ranges of proportions of the three major constituents in a specific system.

Figure 3, sets forth graphically for purposes of illustration specific conductivities for various compositions in the system $NH_4SCN:NH_3:H_2O$ falling within the areas mentioned above in connection with Figures 1 and 2. These specific conductivities, expressed as $$(ohm\text{-}centimeters)^{-1} \times 10^3$$

were obtained by immersing anodized carbon electrodes in the electrolyte, and measuring the resistance upon the passage of 60-cycle alternating current between the electrodes.

The particular design and construction of the cell of the present invention may vary widely depending upon the particular use intended for the cell. In one form of the cell, there may be employed a vessel comprising a cylindrical chamber surrounded by an annular chamber. The two chambers may be separated by a porous diaphragm. The inner chamber may be the cathode compartment containing the cathode and catholyte. The outer chamber may be the anode compartment containing the anode and anolyte. Suitable contact terminals will be provided in each chamber to conduct current. When the anode metal is in the form of the above-discussed liquid "bronze," the bronze may simply be floated on top of the anolyte, or other suitable arrangement may be made so that the liquid "bronze" may contact the anolyte. When the anode metal is in the form of a "bronze" liquid or paste it may be desirable to provide contact between it and the anode terminal by means of a suitable conductor metal that does not react with the anode metal, such as iron, platinum, tungsten, and the like. The cell may take other designs and forms as will be obvious from a consideration of the specific examples set forth hereinafter.

One or more of the components of the cell may be brought into contact with the other components at a particular desired time when it is desired to begin generating current. Thus, the electrolyte as a whole, or a portion thereof, such as the anolyte or catholyte, may be separated from the other components, for example, in a sealed capsule which can be readily ruptured. At the desired time, the capsule may be ruptured thus bringing the liquid into contact with the other components. When contact occurs, the potentials of the cell are established and, the circuit being completed through an external load, current will flow through the circuit. Likewise, when a liquid "bronze" is employed, as the anode, the "bronze" may be kept out of contact with the other components of the cell until the desired time of operation. A cell made in accordance with the above-discussed embodiment may, for example, be used in applications where only a single discharge of the cell is desired. Of course, as is common in ordinary "storage" cells, all of the components of the cell may be in contact, requiring only the completion of the circuit through an external load to cause the generation and flow of current. Herein and in the claims where the cell system is defined, it will be understood to include the embodiment where one or more of the components thereof is temporarily out of contact with the other components, but potentially in contact therewith.

Referring further to the construction of the cell, since liquid ammonia boils at about −33° C., it may be necessary to insure that the ammonia is not evaporated and lost under the conditions of storage and operation. As stated, salt and/or water dissolved in the ammonia will raise the boiling point thereof, so that in certain circumstances, the boiling point of the electrolyte will be such that excessive ammonia will not be lost even under atmosphereic conditions. However, the cell may be so constructed that the electrolyte is sealed from the atmosphere and held under sufficient pressure to maintain it as a liquid at normal atmospheric or room temperatures. Since a small amount of gases may be generated, such as during discharging and recharging of the secondary cell discussed herein, a vent equipped with a suitable valve can be provided.

The cell may be constructed from a wide variety of relatively cheap and available materials, for example, iron, glass or ceramic material, rubber, or synthetic rubber-like materials, synthetic resins, such as polyamides, polytetrafluoroethylene, polymonochlorotrifluoroethylene, and the like.

The electrodes may be of any desired shape, such as flat sheets, rolls, cylinders, bobbins, or the like. When the stated "bronze" or paste is employed as the anode, it may be employed as such or employed on a suitable material such as glass wool, or the like.

The novel cell of the present invention, its preparation and the production of electric current using the same, will be more clearly understood from a consideration of the following specific examples which are given for the purpose of illustration only and are not intended to limit the scope of the invention in any way.

*Example I*

In this example, the anode is prepared by electrodepositing zinc on stainless steel foil and the cathode consists of an impervious film of igneous lead dioxide on stainless steel foil. The construction of the cell is as follows: A sheet of printer's make-ready tissue is placed between the electrodes, and between the anode and the paper separator is placed a thin spacer which leaves a slight open space between the anode and the separator. The total distance between the anode and cathode is .007 inch. The resulting assembly is then immersed in an electrolyte consisting of ammonium thiocyanate dissolved in liquid anhydrous ammonia in a 1:10 mol ratio. The temperature of the electrolyte is −55° C.

Within ¼ second after the electrolyte contacts the anode and cathode, a potential of 1.15 volt under a load density of .16 ohm per square inch is developed. The life of the cell is on the order of two to three minutes.

The same cell operated at 20° C., under pressure, produces about 1.4 volts within much less time than the cell when operated at −55° C. The life of the cell at 20° C. is on the order of about two to three minutes.

The same cell operated at 70° C., under pressure, produces about 1.5 volts. The life of the cell at 70° C. is on the order of about two minutes.

*Example II*

In this example, the anode is magnesium foil, and the cathode is the same as in Example I. The electrolyte is 1⅓ mol percent of ammonium thiocyanate, 1⅓ mol percent of magnesium thiocyanate and 97⅓ mol percent of anhydrous ammonia. The structure of the cell is similar to the cell used in Example I with the exceptions that the separator of printer's make-ready tissue is saturated with 20 weight percent aqueous ammonium thiocyanate solution and dessicated, and the positions of the spacer and separator are inverted.

The temperature of operation is −55° C. At this temperature the cell produces 1.7 volts under a continuous load density of .16 ohm per square inch. After about two minutes the voltage drops to about 1.25 volts. At 25° C., a potential of 1.6 volts is developed, and at 70° C. a potential of 1.4 volts is developed.

*Example III*

In this example the anode is a cast rod of a lithium aluminum alloy ($Li_2Al_3$), and the cathode consists of a 2:1, by weight, mixture of battery grade manganese dioxide and carbon packed around a carbon rod. The structure and dimensions are similar to those of conventional AA dry cell. The electrolyte is a mixture of ammonium thiocyanate, liquid ammonia and water in the proportion of 18 mol percent, 34 mol percent and 48 mol percent, respectively.

When operated at a temperature of −40° C., under a load of .16 ohm per square inch of anode area, the cell produces two volts, and the voltage drops to 1.5 volts after two minutes.

When the cell is operated at 20° C., under a load of .16 ohm per square inch, a voltage of 1.6 is produced which drops to 1.45 after two minutes.

*Example IV*

In this example the anode is zinc foil, the cathode is silver chloride on silver foil (activated by anodization in aqueous sodium hydroxide) and the electrolyte is a solution of ammonium thiocyanate in liquid ammonia in a mol ratio of 1:6.

The immersion of the anode-cathode assembly in the electrolyte at 50° C., under pressure, produces .88 volt; after two minutes the voltage drops to 0.8 volt, and after four minutes the voltage drops to .74 volt.

*Example V*

In this example the anode is lithium metal in the form of a block one-fourth inch thick by one inch on each side. The cell is prepared by placing against one broad face of the lithium block, a sheet of filter paper functioning as a separator and placing against the separator a spacer consisting of cardboard saturated with paraffin and having a hole therethrough representing an open area of one-half square inch. A paste is prepared from a 2:1, by weight, mixture of manganese dioxide and carbon (battery grade) wet with a mixture consisting of 36 mol percent water, 40 mol percent liquid ammonia and 24 mol percent of ammonium thiocyanate. The stated electrolyte makes up about 39% by weight of the paste. The paste is placed in the hole in the spacer. A carbon block one-quarter inch thick by one inch on each side is pressed over the paste-filled hole. The entire assembly is then clamped together, and connections are made directly between the lithium block and the carbon block.

When operated at 25° C., the cell produces 2.7 volts at a load density equivalent to 0.16 ohm per square inch anode area; the voltage dropping to 2.6 volts after one minute and to 2.1 volts after eight minutes.

*Example VI*

In this example, the anode consists of a cylindrical zinc casing about 1⅞ inches long by 9/16 inch outer diameter. The casing is perforated at several points. The cathode consists of a carbon rod 3/16 inch in diameter surrounded by a mixture of dry manganese dioxide and carbon (battery grade) in a 2:1 weight ratio. This mixture is held in place around the carbon rod with one layer of percale. The resulting bobbin assembly is inserted into the zinc casing, and leads are soldered to the casing and to the carbon rod. The electrolyte, which consists of a solution of ammonium thiocyanate in anhydrous liquid ammonia, in a 1:5 mol ratio, is permitted to diffuse into the casing.

Under a load of 40 ohms and at −50° C., the cell gives 1.37 volts, which voltage drops to 1.32 volts after ten minutes. A standard commercial AA Leclanche type cell is inoperative at −50° C., and at −20° C., under a 40 ohm load, gives only 1.28 volts, which voltage drops to 1.11 volts after ten minutes. (The Leclanche cell normally gives about 1.5 volts at ordinary temperatures.)

Under a 20 ohm load and at −50° C., the cell of this example gives 1.23 volts, which voltage drops to 1.18 volts after ten minutes. Under a 20 ohm load, the standard Leclanche cell gives, at −20° C., 0.6 volt which voltage drops to 0.5 volt after ten minutes.

*Example VII*

In this example a glass container having the dimensions of a standard AA cell is employed. Around the inner surface is placed a foil of vacuum distilled calcium to serve as anode. The cathode is the same as employed in Example VI. The electrolyte, which consists of a mixture of lithium thiocyanate, ammonium thiocyanate, liquid ammonia and water, in the proportions of 8.3 mol percent, 8.3 mol percent, 34.4 mol percent and 39 mol percent, respectively, is permitted to diffuse into the container.

At −70° C., the cell gives an open circuit voltage of 2.8 volts, and a short circuit current of .072 ampere is observed.

At 27° C., the cell gives an open circuit voltage of 2.6 volts, and a short circuit current of .085 ampere is observed.

Considerable modification is possible in the selection of the various materials for anode, cathode, and electrolyte, as well as in the combinations thereof, without departing from the scope of the invention.

We claim:

1. An electric current-producing cell comprising an anode, a depolarizing cathode and an electrolyte comprising liquid ammonia having material dissolved and ionized therein to render it electrically conductive, at least the anolyte portion of which comprises ammonium ions.

2. An electric current-producing cell comprising an anode comprising an electropositive metal, a depolarizing cathode and an electrolyte comprising liquid ammonia having material dissolved and ionized therein to render it electrically conductive, at least the anolyte portion of which comprises ammonium ions.

3. An electric current-producing cell comprising an anode comprising an electropositive metal, a depolarizing cathode comprising a compound of a metal having an electrolytic potential in liquid ammonia at least 0.75 volt less than that developed by the metal of the anode in liquid ammonia, and an electrolyte comprising liquid ammonia having material dissolved and ionized therein to render it electrically conductive, at least the anolyte portion of which comprises ammonium ions.

4. An electric current-producing cell comprising an anode, a depolarizing cathode and an electrolyte, including an anolyte, comprising liquid ammonia having water dissolved therein to render it electrically conductive.

5. An electric current-producing cell comprising an anode, a depolarizing cathode and an electrolyte comprising liquid ammonia having a salt dissolved therein to render it electrically conductive, at least the anolyte portion of which comprises ammonium ions.

6. The cell of claim 5 wherein the salt comprises an ammonium salt.

7. An electric current-producing cell comprising an anode, a depolarizing cathode and an electrolyte having a composition within the area AHGED in Figure 1 of the drawing, where MA is a salt soluble in liqued ammonia, and comprising, at least in the anolyte, at least 0.1 mol percent of ammonium ions.

8. An electric current-producing cell comprising an anode, a depolarizing cathode and an electrolyte having a composition within the area BGED in Figure 1 of the drawing, where MA is a salt soluble in liquid ammonia, and comprising, at least in the anolyte portion, at least 0.1 mol percent of ammonium ions.

9. An electric current-producing cell comprising an anode, a depolarizing cathode and an electrolyte having a composition within the area CFED in Figure 1 of the drawing, where MA is a salt soluble in liquid ammonia, and comprising, at least in the anolyte portion, at least 0.1 mol percent of ammonium ions.

10. An electric current-producing cell comprising an anode, a depolarizing cathode and an electrolyte having a composition within the area A'HGED' in Figure 1 of the drawing, where MA is a salt soluble in liquid ammonia, and comprsing, at least in the anolyte portion, at least 0.1 mol percent of ammonium ions.

11. An electric current-producing cell comprising an anode, a depolarizing cathode and an electrolyte having a composition within the area JPMK in Figure 2 of the drawing, where M in the expressions MSCN and MClO$_4$ is a cation selected from the group consisting of NH$_4^+$, Li$^+$, Li$^+$.H$_2$O and Li$^+$.2H$_2$O, and comprising, at least in the anolyte portion, at least 0.1 mol percent of ammonium ions.

12. An electric current-producing cell comprising an anode, a depolarizing cathode and an electrolyte having a composition within the area IOMK in Figure 2 of the drawing, where M in the expressions MSCN and MClO$_4$ is a cation selected from the group consisting of NH$_4^+$, Li$^+$, Li$^+$.H$_2$O and Li$^+$.2H$_2$O, and comprising, at least in the anolyte portion, at least 0.1 mol percent of ammonium ions.

13. An electric current-producing cell comprising an anode, a depolarizing cathode and an electrolyte having the composition JPNLK in Figure 2 of the drawing, where M in the expressions MSCN and MClO$_4$ is a cation selected from the group consisting of NH$_4^+$, Li$^+$, Li$^+$.H$_2$O and Li$^+$.2H$_2$O, and comprising, at least in the anolyte portion, at least 0.1 mol percent of ammonium ions.

14. An electric current-producing cell comprising an anode, a depolarizing cathode and an electrolyte having the composition IONLK in Figure 2 of the drawing, where M in the expressions MSCN and MClO$_4$ is a cation selected from the group consisting of NH$_4^+$, Li$^+$, Li$^+$.H$_2$O and Li$^+$.2H$_2$O, and comprising, at least in the anolyte portion, at least 0.1 mol percent of ammonium ions.

15. An electric current-producing cell comprisng an anode, a depolarizing cathode and an electrolyte having the composition J'PMK' in Figure 2 of the drawing, where M in the expressions MSCN and MClO$_4$ is a cation selected from the group consisting of NH$_4^+$, Li$^+$, Li$^+$.H$_2$O and Li$^+$.2H$_2$O, and comprising, at least in the anolyte portion, at least 0.1 mol percent of ammonium ions.

16. The cell of claim 7 wherein said anode comprises an electropositive metal, and wherein said cathode comprises a compound of a metal having an electrolytic potential in liquid ammonia at least 0.75 volt less than that developed by the metal of the anode in liquid ammonia.

17. The cell of claim 11 wherein said anode comprises an electropositive metal, and wherein said cathode comprices a compound of metal having an electrolytic potential in liquid ammonia at least 0.75 volt less than that developed by the metal of the anode in liquid ammonia.

18. An electric current-producing cell comprising an anode comprising an electropositive metal, an anolyte comprising, dissolved in anhydrous liquid ammonia, an ammonium salt and a metal salt, the cation of which is a metal corresponding to the electropositive metal of the anode, and a cathode comprising a conducting electrode and a salt dissolved in anhydrous liquid ammonia the cation of which is selected from the group consisting of ammonium and metals while develop an electrolytic potional in liquid ammonia at least 0.75 volt less than that developed by the metal of said anode in liquid ammonia.

19. The method of generating electric current which comprises contacting an anode and a cathode with an electrolyte comprising liquid ammonia having material dissolved and ionized therein to render it electrically conductive, at least the anolyte portion of which comprises ammonium ions, and completing the circuit with an external load between the anode and cathode.

20. The method of generating eletcric current which comprises contacting an anode and a depolarizing cathode with an electrolyte having a composition within the area AHGED in Figure 1 of the drawing, where MA is a salt soluble in liquid ammonia, and comprising, at least in the anolyte portion, at least 0.1 mol % of ammonium ions, and completing the circuit with an external load between the anode and cathode.

21. The method of claim 20 wherein the electrolyte has a composition within the area BGED in Figure 1 of the drawing.

22. The method of claim 21 wherein the electrolyte has a composition within the area CFED in Figure 1 of the drawing.

23. The method of claim 20 wherein the electrolyte has a composition within the area A'HGED' in Figure 1 of the drawing.

24. The method of generating electric current which comprises contacting an anode and a depolarizing cathode with an electrolyte having a composition within the area JPMK in Figure 2 of the drawing where M in the expressions MSCN and MClO$_4$ is a cation selected from the group consisting of NH$_4^+$, Li$^+$, Li$^+$.H$_2$O and Li$^+$.2H$_2$O, and comprising, at least in the anolyte portion, at least 0.1 mol percent of ammonium ions, and completing the circuit with an external load between the anode and cathode.

25. The method of claim 24 wherein the electrolyte has a composition within the area IOMK in Figure 2 of the drawings.

26. The method of claim 24 wherein the the electrolyte has a composition within the area JPNLK in Figure 2 of the drawing.

27. The method of claim 24 wherein the electrolyte has a composition within the area IONLK of Figure 2 of the drawing.

28. The method of claim 24 wherein the electrolyte has a composition within the area J'PMK' in Figure 2 of the drawing.

29. The method of claim 24 wherein the electrolyte has a composition within the area J'PNLK' in Figure 2 of the drawing.

30. The method of generating electric current which comprises contacting an anode comprising an electropositive metal with an anolyte comprising, dissolved in anhydrous liquid ammonia, an ammonium salt and a metal salt the cation of which is a metal corresponding to the electropositive metal of the anode; contacting a cathode conductor with a catholyte comprising a salt dissolved in anhydrous liquid ammonia the cation of which is selected from the group consisting of ammonium and metals which develop an electrolytic potential in liquid ammonia at least 0.75 volt less than that developed by the metal of said anode in liquid ammonia, said catholyte and anolyte being at least in ionic flow relationship, and completing the circuit with an external load between the anode and cathode conductor.

References Cited in the file of this patent

UNITED STATES PATENTS

| | | |
|---|---|---|
| 625,287 | Brauet | May 16, 1899 |
| 1,285,054 | French et al. | Nov. 19, 1918 |

OTHER REFERENCES

Kraus: J. of Am. Chem. Soc., vol. 36, pp. 864–77, May 1914.

Sedlet et al.: J. Am. Chem. Soc., vol. 73, pp. 5808–10, December 1951.

Elliott et al.: J. Am. Chem. Soc., vol. 56, pp. 1057–60, May 1934.